United States Patent
Hsu

(10) Patent No.: US 7,067,767 B2
(45) Date of Patent: *Jun. 27, 2006

(54) TWO STAGE WELDER AND METHOD OF OPERATING SAME

(75) Inventor: Christopher Hsu, Mentor, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/011,467

(22) Filed: Dec. 14, 2004

(65) Prior Publication Data

US 2005/0098550 A1  May 12, 2005

Related U.S. Application Data

(63) Continuation of application No. 10/683,023, filed on Oct. 10, 2003, now Pat. No. 6,872,914, which is a continuation of application No. 10/091,278, filed on Mar. 6, 2002, now Pat. No. 6,717,107, which is a continuation-in-part of application No. 09/866,358, filed on May 29, 2001, now Pat. No. 6,515,259.

(51) Int. Cl.
  *B23K 9/09* (2006.01)
(52) U.S. Cl. ............................ 219/130.51; 219/130.21
(58) Field of Classification Search ........... 219/130.51, 219/130.21, 130.31, 130.32, 130.33, 130.5, 219/137 PS See application file for complete search history.

(56) References Cited

U.S. PATENT DOCUMENTS

| | | | |
|---|---|---|---|
| 3,781,511 A | 12/1973 | Rygiol | |
| 4,521,671 A * | 6/1985 | Fronius | 219/130.31 |
| 4,889,969 A | 12/1989 | Kawai et al. | |
| 5,220,151 A | 6/1993 | Terayama et al. | |
| 5,416,299 A | 5/1995 | Tabata et al. | |
| 5,990,445 A * | 11/1999 | Ogasawara et al. | 219/130.5 |
| 6,501,049 B1 * | 12/2002 | Stava | 219/137 PS |
| 6,515,259 B1 | 2/2003 | Hsu et al. | |
| 6,617,549 B1 * | 9/2003 | Ihde | 219/137 PS |
| 6,717,107 B1 | 4/2004 | Hsu | |
| 6,794,608 B1 * | 9/2004 | Flood et al. | 219/130.51 |
| 6,872,914 B1 * | 3/2005 | Hsu | 219/130.51 |

* cited by examiner

*Primary Examiner*—Clifford C. Shaw
(74) *Attorney, Agent, or Firm*—Fay, Sharpe, Fagan, Minnich & McKee, LLP

(57) ABSTRACT

An electric arc GMAW welder is provided, which welder includes a high speed switching power supply with a controller for creating a first or second weld process across the gap between a workpiece and a welding wire advanced toward the workpiece. The first process uses a first current waveform and the second process uses a second current waveform. A circuit is provided for shifting between the first and second weld processes. The shifting circuit includes a counter for counting the waveforms in the first and second processes and a circuit to shift from the process being processed to the other weld process when the waveform count of the weld process being processed reaches a preselected number for such weld process.

5 Claims, 2 Drawing Sheets

TWO STAGE WELDER AND METHOD OF OPERATING SAME

This application is a continuation of application Ser. No. 10/683,023 filed Oct. 10, 2003 now U.S. Pat. No. 6,872,914, incorporated herein by reference, and owned by Assignee of this application. The application Ser. No. 10/683,023 is a continuation of U.S. Pat. No. 6,717,107, Ser. No. 10/091,278, filed on Mar. 6, 2002, which is a continuation-in-Part of U.S. Pat. No. 6,515,259, application Ser. No. 09/866,358, filed May 29, 2001 both of which are also owned by Assignee of this application and incorporated herein by reference.

The invention relates to the art of electric arc welding and more particularly to an electric arc welder having two stage or two mode operation and the method performed by this two stage electric arc welder.

INCORPORATION BY REFERENCE

As background information, prior pending application Ser. No. 866,358 filed on May 29, 2001 together with references incorporated by reference in that application are hereby incorporated by reference. Kawai U.S. Pat. No. 4,889,969 shows a switch to shift between DIP welding and pulse welding and is incorporated by reference as background technology.

BACKGROUND OF INVENTION

Electric arc welders of the GMAW type are often powered by a high speed switching power supply or power source with a controller for controlling the current waveform of the welding process. The Lincoln Electric Company of Cleveland, Ohio has pioneered the concept of an electric arc welder with a wave shaper to control the shape of the current waveform during each cycle by the use of high frequency current pulses, the magnitude of each pulse being controlled by a pulse width modulator. In such welders, the wave shape of the current is accurately controlled to perform such diverse welding processes as pulse welding, constant voltage welding, spray welding, pulse welding, short-arc CV welding and STT welding. In such processes, the wave shape for each weld cycle is controlled by the pulse width modulator to produce a series of welding cycles that perform a designated process. Such arc welders are quite versatile; however, they are operated in selected mode by controlling the pulses created by the waveform shaper.

THE INVENTION

The present invention relates to an electric arc welder, of the type mentioned above, where the controller is shifted between two separate and distinct welding processes or welding modes. In accordance with the invention, the pulse shaper or pulse generator shapes a series of pulses forming a first welding process. The controller is shiftable to then perform a second welding process by implementing a series of different pulse shapes constituting a different mode of operation. By counting the cycles in the first mode of operation, the first process is terminated and the second process is initiated. Thereafter, the cycles of the next process are counted until they reach a set number, which indicates that the welder is to be shifted back to the first welding process. Thus, the electric arc welder has the capability of performing two separate welding processes by switching the controller from one mode of operation to another mode of operation. By this unique two stage or two state operation of an electric arc welder, the welder can perform a welding operation alternately using a first process and then a second process. For instance, a high energy process is performed for a short time and then the welder is converted to a low energy weld process. If the two processes are STT, low energy STT cycles are implemented followed by implementation of high energy STT cycles. Thus, in one embodiment, the first process is a high energy process and the second is a low energy process. A counted number of cycles of each process are used in the welding process to perform a total welding operation by implementing in series the first and second welding processes. As an example, in one specific embodiment the first process is a constant voltage spray process with high heat. The second process is a pulsed GMAW or low heat welding process. In the welding operation, the controller first implements the first process for a number of cycles and then the second process for a number of cycles. In another embodiment of the invention, the first process is a pulse welding process where the pulses have high energy or high heat. This is used in sequence with a low heat STT weld process for a number of cycles. By alternating between the pulse cycles and the STT cycles, a desired total welding operation is performed. In another embodiment, the first process is a pulse welding process having high heat. This process is alternated with a second weld process, which is a short-arc, constant voltage welding process. In a still further embodiment, the first weld process is a pulse process for high heat. The second weld process is a series of pulses where the energy of the pulses are determined by a closed loop feedback of the power exerted. A still further example of the invention is an embodiment where the first series of pulses in the pulse welding operation are electrode positive to give high heat. The second series of pulses is a pulse welding process are negative, comprising electrode constant voltage pulses. By shifting between these welding processes, the actual welding operation is controlled to optimize the performance of the welder.

In accordance with still another aspect of the invention, the first weld process of this two stage or two state electric arc welder is a pulse welding process. This process is continued until the arc voltage indicates a short circuit. Then, the two stage welder is shifted to a short clearing weld process, such as an STT weld cycle. In the preferred embodiment, the signal to shift from the pulse welding process is not only dependent upon the indication of a short by a plunge in the arc voltage, but also on the time of a timer. The arc welder control shifts from the first weld process of the pulse mode into a short clearing process only when the short is sustained for a set time. The timer is preferably set to indicate that the short is maintained for at least 1.0 ms and preferably greater than a set time in the range of at least 0.2 to 0.5 ms. Consequently, only when there is an actual short, instead of an incipient short, does the electric arc welder shift into the second weld process for clearing the detected short circuit.

In accordance with the present invention there is provided an electric arc welder including a high speed switching power supply with a controller for creating a first and second weld process across the gap between a workpiece and a welding wire advancing toward the workpiece. The first process uses a first current waveform and the second process uses a second current waveform. A circuit is used to shift between the first and second weld processes, wherein the circuit includes a counter for counting the waveforms in the first and second processes. The welder shifts from the process being processed to the other weld process when the waveform count of the weld process being processed reaches a preselected number for each weld process. By using this two stage welder, the arc welder can be shifted between two separate and distinct welding processes in accordance with the count or other parameter.

In accordance with another aspect of the invention, there is a two stage arc welder of the type including a high speed switching power supply with a controller for creating a pulse wave weld process and a weld process to clear a detected short. A circuit is activated to create a short signal when the arc voltage is below a value indicative of a short and there is a switch to shift the controller from the pulse wave process to the short clearing process by a process shift signal created upon creation of the short signal. In an aspect of the invention, the two stage welder includes a timer to create the shift signal only when the short signal is held for a given time which is defined as greater than about 1.0 ms and preferably greater than a set time in the general range of 0.2 to 0.5 ms. Consequently, when the short is maintained for a preselected time, the two stage welder is shifted from the pulse mode of operation to a short clearing mode of operation. In the preferred embodiment, the short clearing mode of operation is an STT weld process.

In accordance with yet a further aspect of the invention, there is provided a method of operating an electric arc welder of the type including a high speed switching power supply with a controller. This controller creates a first and second weld process across a gap between the workpiece and the welding wire advancing toward the workpiece by a wire feeder. The first process of the method has a first current waveform. The second process has a second waveform. The method comprises shifting between the first and second weld processes and is implemented by counting the waveforms in the first and second processes. The weld process being performed is shifted to the other process when the waveform count of the process being performed reaches a selected number. In a further aspect of the present invention there is a provision of a method of operating an electric arc welder including a high speed switch and power supply with a controller for creating a pulse wave process and a short clearing weld process. The method comprises creating a short signal when the arc voltage is below a value indicative of a short and then shifting the controller from the pulse wave process to the short clearing process by a shift signal created upon detection of the short circuit. In this method, the shift signal is created only when the short signal is held for a given time which in practice is less than 1.0 ms and actually in the general range of 0.20–0.50 ms.

The primary object of the present invention is the provision of a two stage electric arc welder that alternately performs two welding processes during a single welding operation.

Yet another object of the present invention is the provision of a two stage arc welder, as defined above, which arc welder has a counter to count the cycles of one process to determine when there is to be a shift in the process being performed by the welder.

Still a further object of the present invention is the provision of a two stage arc welder, as defined above, which two stage arc welder performs a pulse welding process until a non-incipient short is detected. Then, the two stage welder is shifted into a second mode of operation for clearing the short.

Another object of the present invention is the provision of a method of operating a two stage arc welder, as defined above.

Still a further object of the present invention is the operation of a two stage arc welder, as defined above, which two stages involve one of many combinations of a distinct first welding process and a distinct, different second welding process. The two processes alternate back and forth during a single welding operation.

These and other objects and advantages will become apparent from the following description taken together with the accompanying drawings.

PREFERRED EMBODIMENTS

Figure 1:
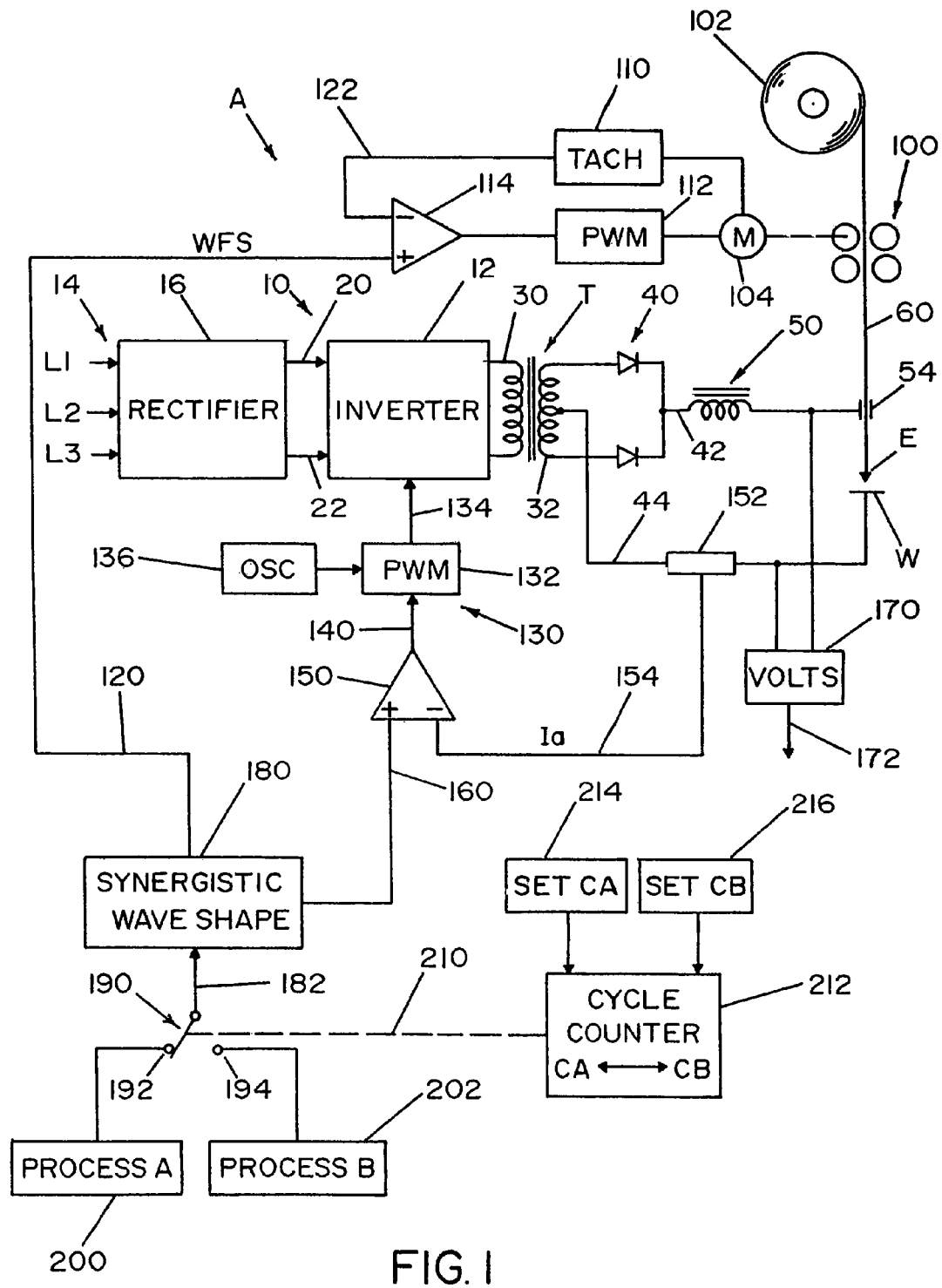
FIG. 1 is a combined block and wiring diagram illustrating the preferred embodiment of the two stage arc welder of the present invention.

Referring now to the drawings, wherein the showings are for the purpose of illustrating a preferred embodiment of the invention only and not for the purpose of limiting same, FIG. 1 shows a novel two stage welder A with a power source 10 comprising a high speed switching power supply illustrated as inverter 12 having a three phase power supply input 14 converted by rectifier 16 into a DC rail in lines 20, 22. Output winding 30 of inverter 12 is the primary winding of transformer T having a secondary winding 32 for supplying current to a rectifier network 40. This network provides a current level through positive lead 42 and negative lead 44. A standard small inductor 50 is connected to a standard contact tip 54, through which passes a welding wire 60 that forms electrode E spaced from workpiece W to define an arc gap through which the current is passed during the arc welding process. Welder A performs many types of electric arc welding by passing a current of a preselected shape across the gap between electrode E and workpiece W. As the arc melts wire 60 and workpiece W to perform a welding operation, wire feeder 100 pulls wire from reel 102 at a speed (WFS) determined by the rotational speed of motor 104. This speed is read by a feedback tachometer 110 and is controlled by the input voltage to pulse width modulator 112 from the output of error amplifier 114. This amplifier has a first input 120 which is the voltage representing the desired wire feed speed (WFS). This speed may be controlled by an analog circuit or more appropriately from a look-up table from wave shaper 180. The input voltage 120 determines the speed of motor 104, which actual speed is monitored by tachometer 110 for comparison with the voltage on line 120. The actual speed feedback is the voltage on input line 122. In this manner, the wire feed speed is coordinated with the weld process being implemented by welder A. The current wave shape across electrode E and workpiece W is determined by software controller 130 of the type including a software pulse width modulator 132 for generating a voltage on output control line 134 at a pulse rate determined by the set frequency of oscillator 136. In this manner, the high frequency pulses on line 134 are controlled by the voltage on line 140, which voltage is the output of a second error amplifier 150 having a first input controlled by current detecting or sensing shunt 152. The voltage on line 154 is representative of the arc current of the welding process. A command signal on line 160 is compared to the actual arc current represented by the voltage on line 154 to cause the pulse width modulator 132 to follow the desired wave shape from wave shaper or generator 180 by way of command line 160. The wire feed speed to error amplifier 114 is also directed from the wave shaper or generator. The generator 180 is of the synergistic type so that both the command signal 160 and the wire feed speed signal or voltage (WFS) on line 120 are coordinated.

In accordance with the novel aspect of welder A, there is provided a switch 190 which, in practice, is a software switch having a first position 192 and a second position 194, as shown in FIG. 1. When in position 192, wave shaper 180 is controlled by command line 182 in accordance with a first Process A from process control system 200 for Process A. In this manner, process control system 200 is connected to the synergistic wave shaper 180 to implement Process A from the wave shaper 180 by way of controller 130. In a like manner, when switch 190 is in position 194, process control system 200 through command line 182 causes wave shaper 180 to implement the second Process B by way of the signal on command line 160. Thus, by shifting switch 190 between positions 192, 194, two separate welding processes are performed by welder A. Of course, it is within the present invention to have switch 190 with more than two positions so that the welder can process in sequence or in series more than two welding processes, if such operation is desired. In practice, it is preferred that only two separate weld processes be performed alternately by welder A. In accordance with another aspect of the invention, the position of switch 190 is controlled by logic on dashed line 210 from the output of cycle counter 212. The counter counts each cycle during either Process A or Process B. At the end of the count, as set by count selector 214 or count selector 216, the logic on line 210 shifts switch 190 into the other position for implementing the other weld process. Counter 212 counts to a number CA and then shifts to Process B which is maintained until the counter counts to a number CB. Then, switch 190 shifts back to the first process, i.e. Process A. In the preferred embodiment, one of the processes is a high heat process and the other is a low heat process. The numbers CA and CB are essentially the same. Thus, the welding operation involves a low heat portion and high heat portion which are repeatedly implemented during the total welding process to control the performance of the welding operation whether it is STT, pulse or otherwise. As will be shown, various weld processes can be alternately selected by a counter. Indeed, the welder A can be interactive so that the shift from one process to the other is determined by parameters as distinguished from count numbers. For instance, the voltage sensor 170 produces a voltage on line 172 that detects a short, which is used in FIG. 2 for transition between the first Process A and the second Process B wherein the second process is an arc clearing process. The counts can be drastically different and the interactive parameters can be selected to shift into a preselected process after a given process transitions into a detectable weld condition.

In practice, Process A is normally a high energy process and Process B is a low energy process. The count numbers CA and CB are essentially the same. To change the welding operation, number CA is increased or number CB is decreased to increase the heat during the welding operation. In a like manner, to decrease the heat, the number CA is decreased or the number CB is increased. Of course, combinations of these increases or decreases could be used in selecting the desired total heat during a welding operation. In a preferred embodiment, Process A and Process B are the same, but with different size waveforms. It may be pulse welding or STT welding. However, in accordance with the invention, the processes could be completely diverse. For instance, in practice, Process A is a constant voltage spray process with high heat and Process B is a pulsed GMAW low heat. Counter 212 is set by count selectors 214, 216 to the desired total heat for the welding operation. In practice, Process A is a pulse welding process with high heat whereas Process B is an STT weld process with a lower wire feed speed. Also, in practice Process A is a pulse welding process with higher heat and Process B is a short-arc constant voltage process. A still further implementation of the present invention Process A is a pulse welding process and Process B is a closed loop control process, such as a process wherein the current is controlled by the output power. Yet a further implementation of the present invention is where Process A is a pulse electrode positive and Process B is an electrode negative constant voltage weld process. In that implementation of the present invention, a polarity switch is added in the output circuit before inductor 50, which polarity circuit is shifted at the same time as switch 190. Other implementations of the present invention involve various combinations of welding process to perform the desired overall weld operation.

Figure 2:
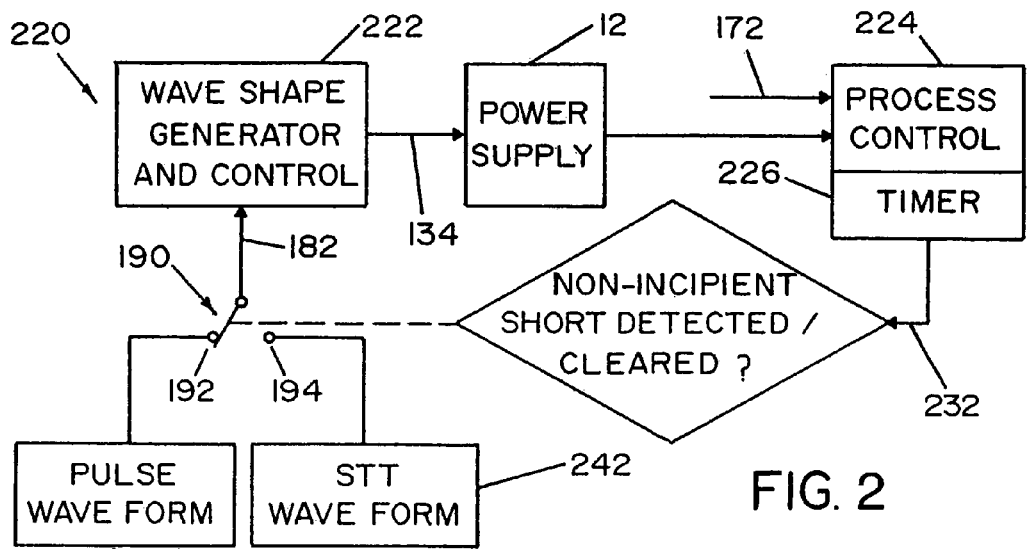
FIG. 2 is a flow chart in block diagram format of a method and operation for the two stage arc welder, whereby a detected non-incipient short shifts the welding process being performed.

An interactive control system 220 is schematically illustrated in FIG. 2, wherein the wave shaper generator and control 222 creates the voltage on control line 134, as previously described. Controller 130 is in block 222. The voltage controls power supply 12 which is monitored by a process control network 224 together with the voltage on line 172 from voltage sensor 170, shown in FIG. 1. Timer 226 of the process control network is set to a time generally greater than about 1.0 ms and preferably greater than a set time in the general range of 0.2–0.5 ms. The output from the timer network is a logic on line 232 directed to a decision block 230 to decide whether or not there is a short circuit that has been detected for a time greater than the time set of time 226. The position of switch 190 is controlled by decision block 230. When there is a short that exceeds the set time of timer 226, switch 190 is shifted into position 194. Thus, when there is a long term non-incipient short, switch 190 shifts to the alternate position 194 to implement the second weld process. In this implementation of the present invention, the first process is a pulse wave form controlled in accordance with the wave shape determined by a system shown as block 240. Block 242 represents a system to create an SU wave form or other short clearing weld process. System 220 performs the first mode of operation defined as a pulse wave form controlled by the system represented by block 240. Whenever there is a short, the voltage on line 172 drops down below a threshold. This determines a short circuit. Such detected condition is timed by timer 226. If the time of the short exceeds the set time of the timer, the logic on line 232 indicates to the decision block that there is a non-incipient actual short circuit. This logic immediately shifts the software switch 190 to the arc clearing weld process, indicated as an STT process. When the short is cleared in accordance with the short clearing process, the voltage on line 172 immediately shifts to a plasma level or arc voltage. This is above the threshold and causes decision block 230 to shift switch 190 into position 192 for implementation of the pulse wave form controlled by the system represented by block 240. Consequently, system 220 does not involve a cycle counter, but senses a welding parameter for actual shifting of the weld process from one weld process to the other. This happens rapidly and occurs whenever the selected parameter is detected.

Figure 3:
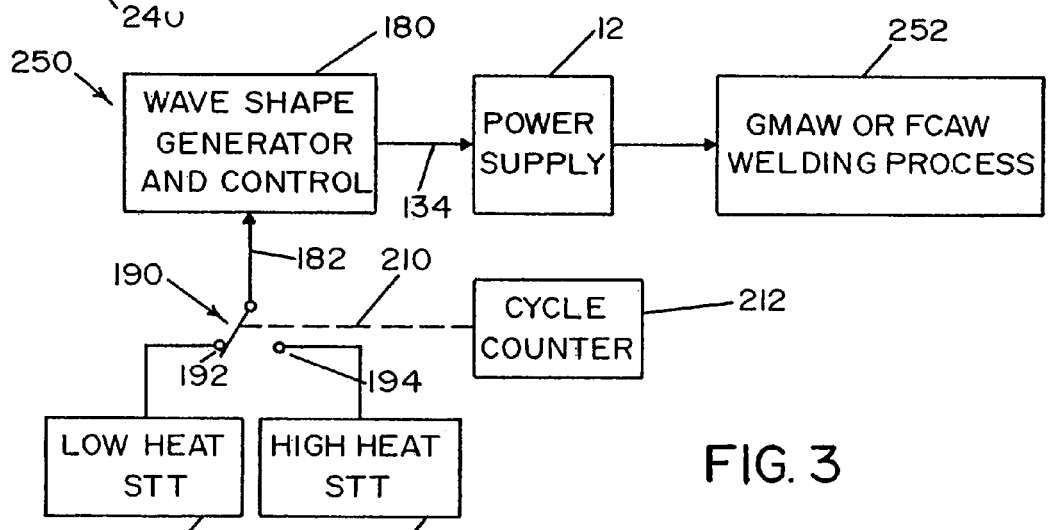
FIG. 3 is a flow chart in block diagram format showing a further implementation of the two stage welder, constructed in accordance with the present invention; and, FIG. 4 is a current graph illustrating the operation of the two stage welder in accordance with the implementation of the invention illustrated in FIG. 3.
Figure 4:
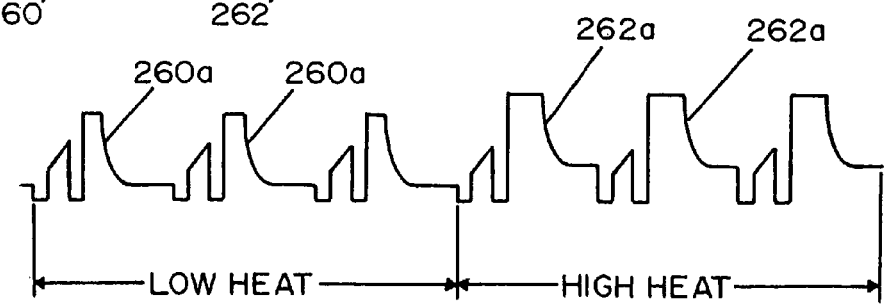

In FIGS. 3 and 4, system 250 is schematically illustrated wherein the wave shaper generator and control 180 creates the voltage on control line 134, as previously described. The voltage controls power supply 12 which is monitored by a GMAW or FCAW welding process 252. System 250 includes a low heat weld process represented by block 260. Process A is a low heat STT weld process. In a like manner, a high heat STT weld process is represented by block 262. Counter 212 causes first STT pulses 260*a* to be processed as shown in FIG. 4. After the desired number of STT pulses 260*a* have been counted by cycle counter 212, switch 190 is shifted into position 194 by the logic on line 210. This generates the large, or high heat, STT pulses 262*a*, as shown in FIG. 4. These high heat pulses are counted in accordance with the selected number for counter 212. In this manner, the number of waveforms or cycles of low and high STT is adjusted to determine the total heat during a welding operation.

The invention involves a two or more stage welder which implements in sequence distinctly different welding processes. Preferably, the duration of these processes is determined by a counter; however, a parameter can be used for shifting between the weld processes. Only representative processes have been discussed and other weld processes can be used when implementing the invention.

Having thus defined the invention, the following is claimed:

1. An electric arc welder including a high speed switching power supply with a controller for creating a pulse wave weld process using a first current waveform comprising a first series of pulses and a weld process to clear a short using a second current waveform comprising a second series of pulses, a circuit activated to create a short signal when the arc voltage is below a value indicative of a short and a switch to shift said controller from said pulse wave process to said short clearing process by a process shift signal created upon creation of said short signal, wherein said short clearing process is a surface tension transfer weld generating process.

2. An electric arc welder as defined in claim 1 including a timer to create said shift signal only when said short signal is held for a given time.

3. An electric arc welder as defined in claim 1 wherein said circuit activated to create a short signal is actuated at a time when a short condition exists generally greater than 1.0 ms.

4. An electric arc welder as defined in claim 1 wherein said circuit actuated to create a short signal is activated at a time when a short condition exists for greater than a set time in a general range of 0.2 to 0.5 ms.

5. An electric arc welder as defined in claim 1, wherein when said short clearing process clears the short, a voltage of the arc welder shifts to a plasma level or arc voltage.

\* \* \* \* \*